United States Patent
Ishikawa et al.

(10) Patent No.: US 7,047,116 B2
(45) Date of Patent: May 16, 2006

(54) ELECTRIC DRIVE CONTROL APPARATUS, ELECTRIC DRIVE CONTROL METHOD AND PROGRAM THEREFOR

(75) Inventors: Masami Ishikawa, Anjo (JP); Ken Iwatsuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 191 days.

(21) Appl. No.: 10/743,050

(22) Filed: Dec. 23, 2003

(65) Prior Publication Data

US 2004/0148070 A1    Jul. 29, 2004

(30) Foreign Application Priority Data

Dec. 26, 2002 (JP) .............................. 2002-378400

(51) Int. Cl.
*G06F 7/00* (2006.01)

(52) U.S. Cl. .................... 701/22; 307/9.1; 180/65.1; 180/65.3

(58) Field of Classification Search ................. 701/22; 318/432, 433; 341/9, 11; 180/65.1, 65.3; 307/9.1

See application file for complete search history.

(56) References Cited

U.S. PATENT DOCUMENTS

| | | | |
|---|---|---|---|
| 6,812,861 B1* | 11/2004 | Wolf | 341/11 |
| 2005/0046369 A1* | 3/2005 | Kobayashi et al. | 318/432 |
| 2005/0075766 A1* | 4/2005 | Kobayashi et al. | 701/22 |

FOREIGN PATENT DOCUMENTS

JP    A 11-332298    11/1999

* cited by examiner

*Primary Examiner*—Yonel Beaulieu
(74) *Attorney, Agent, or Firm*—Oliff & Berridge, PLC

(57) ABSTRACT

An electric drive control apparatus including an electrically operated machine, a detector for detecting a current supplied to the electrically operated machine, and a controller that estimates a subsequent current based on a detected current, effects proportional operation processing based on an estimated current, effects integration operation processing based on the detected current, generates output signals based on a first value of the proportional operation processing and a second value of the integration operation processing, and generates an electric current to be fed to the electrically operated machine based on the output signals.

14 Claims, 5 Drawing Sheets

US 7,047,116 B2

ELECTRIC DRIVE CONTROL APPARATUS, ELECTRIC DRIVE CONTROL METHOD AND PROGRAM THEREFOR

INCORPORATION BY REFERENCE

The disclosure of Japanese Patent Application No.2002-378400 filed on Dec. 26, 2002, including the specification, drawings and abstract are incorporated herein by reference in their entirety.

BACKGROUND OF THE INVENTION

1. Field of Invention

This invention relates to an electric drive control apparatus, an electric drive control method and a program therefor.

2. Description of Related Art

In a conventional electric drive unit that is mounted on a vehicle, for example, an electric vehicle or electric car, drive motor torque from a drive motor is transmitted to drive wheels in order to obtain a driving force. Further, in an electric drive unit that is mounted on an electric vehicle or a hybrid vehicle that transmits part of the engine torque to a generator (generator-motor), which is a first electrically operated machine, and that transmits the rest of the engine torque to the drive wheels, a planetary gear unit is provided. The planetary gear unit includes a sun gear, a ring gear and a carrier, to couple the carrier to the engine, to couple the ring gear to the drive wheels, to couple the sun gear to the generator, and to transmit the rotation produced by the ring gear and by a drive motor, which is a second electrically operated machine, to the drive wheels to obtain a driving force.

In the generator and the drive motor, a rotor is arranged such that the rotor is allowed to freely rotate. The rotor also has a pair of magnetic poles comprising permanent magnets of a N-pole and a S-pole. The drive motor also includes a stator disposed on the outer side of the rotor in the radial direction and having stator coils of U-phase, V-phase and W-phase.

The electric car is furnished with a drive motor control apparatus as an electromechanical controller. The hybrid vehicle is furnished with a generator control apparatus and a drive motor control apparatus as an electrically operated machine control apparatus. Pulse width modulation signals of the U-phase, V-phase and W-phase generated by the electrically operated machine control apparatus are sent to an inverter, and phase currents generated by the inverter are fed. In other words, currents of the U-phase, V-phase and W-phase are fed to the stator coils to energize the drive motor to thereby obtain a drive motor torque, or to drive the generator to obtain a generator torque.

In the above drive motor control apparatus, for example, a feedback control is executed by a vector control operation on a d-q axis model by setting a d-axis in a direction of the magnetic pole pair of the rotor, and setting a q-axis in a direction at right angles with the d-axis. In the drive motor control apparatus, therefore, currents fed to the stator coils are detected as detection currents, are converted into a d-axis current and a q-axis current, and the feedback control is executed based on the d-axis current, the q-axis current, a d-axis current instruction value and a q-axis current instruction value representing a target value. (see, for example, JP-A-11-332298).

When, for example, a driver attempts to quickly start the electric car by depressing the accelerator pedal, the d-axis current instruction value and the q-axis current instruction value may often change sharply. However, when the sampling period of the detection current is long, the gain in carrying out the feedback control cannot be increased. Therefore, the sampling periods are substantially shortened by estimating a d-axis current and a q-axis current after one sampling time, and by executing the proportional integration control based on the estimated d-axis current, q-axis current and on the d-axis current instruction value and q-axis current instruction value.

FIG. 2 is a block diagram illustrating a major portion of a conventional electric drive unit. In FIG. 2, reference numeral 31 denotes a drive motor (M) and 40 denotes an inverter that generates currents Iu, Iv and Iw of U-phase, V-phase and W-phase and feeds them to the drive motor 31. Reference numeral 45 denotes a drive motor control apparatus which includes a three phase/two phase converter unit 61, subtractors 62, 63, voltage instruction value generator units 64, 65, and a two phase/three phase converter unit 67. A drive circuit that is not shown is provided outside the drive motor control unit 45, and a PWM generator that is not shown is provided in the drive motor control unit 45.

The drive motor 31 is allowed to freely rotate, and includes a rotor (not shown) having a pair of electrodes comprising permanent magnets of N-pole and S-pole, and a stator (not shown) arranged outside of the rotor in the radial direction and having stator coils of U-phase, V-phase and W-phase. There are further arranged current sensors 33 and 34 for detecting the currents fed to the U-phase and V-phase stator coils, and a magnetic pole position sensor (not shown) for detecting the magnetic pole position θ of the rotor.

A torque instruction/current instruction converter unit (not shown) in the drive motor control unit 45 reads a battery voltage detected by a battery voltage sensor (not shown), i.e., reads the rotational speed NM of the drive motor 31 calculated based on the battery voltage VB and the magnetic pole position θ, reads a target torque TM* of the drive motor from the vehicle control apparatus that controls the vehicle as a whole, makes reference to a map of current instruction values (not shown), calculates a d-axis current instruction value id* and a q-axis current instruction value iq*, and sends them to subtractors 62 and 63.

Here, to conduct the feedback control operation, the drive motor control unit 45 reads detection currents iu and iv from the current sensors 33 and 34, and reads the magnetic pole position θ from the magnetic pole position sensor. The three phase/two phase converter unit 61 effects the three phase/two phase conversion based on the detection currents iu, iv and the magnetic pole position θ, and converts the detection currents iu, iv into a d-axis current id and a q-axis current iq.

Next, the d-axis current id is sent to a current estimation unit 71 which calculates and estimates a d-axis current after one sampling timing, and the estimated d-axis current idp is sent to the subtractor 62. The subtractor 62 calculates a d-axis current deviation Δid between the d-axis current idp and the d-axis current instruction value id*. The d-axis current deviation Δid is sent to the voltage instruction value generator unit 64.

The voltage instruction value generator unit 64 includes a proportional integration operation unit (PI) 73 and a subtractor 74. The proportional integration operation unit 73 calculates a voltage drop Vzd based on the d-axis current deviation Δid, a gain Kp for the proportional operation and a gain Ki for the integration operation. The subtractor 74 subtracts an induced voltage ed due to the q-axis current iq from the voltage drop Vzd, generates such a d-axis voltage instruction value vd* so that the d-axis current deviation Δid becomes zero (0), and sends the d-axis voltage instruction value vd* to the two phase/three phase converter unit 67.

On the other hand, the q-axis current iq is sent to a current estimation unit 72 which estimates a q-axis current iqp after one sampling timing, and the estimated q-axis current iqp is sent to the subtractor 63. The subtractor 63 calculates a q-axis current deviation Δiq between the q-axis current iqp and the q-axis current instruction value iq*. The q-axis current deviation Δiq is sent to the voltage instruction value generator unit 65.

The voltage instruction value generator unit 65 includes a proportional integration operation unit (PI) 75 and an adder 76. The proportional integration operation unit 75 calculates a voltage drop Vzq based on the q-axis current deviation Δiq. The adder 76 adds an induced voltage eq due to the d-axis current id to the voltage drop Vzq, generates such a q-axis voltage instruction value vq* so that the q-axis current deviation Δiq becomes zero (0), and sends the q-axis voltage instruction value vq* to the two phase/three phase converter unit 67.

Then, the two phase/three phase converter unit 67 effects the two phase/three phase conversion, reads the d-axis voltage instruction value vd*, q-axis voltage instruction value vq* and magnetic pole position θ, converts the d-axis voltage instruction value vd* and q-axis voltage instruction value vq* into voltage instruction values Vu*, Vv* and Vw* of U-phase, V-phase and W-phase, and sends the voltage instruction values Vu*, Vv* and Vw* to the PWM generator.

Based on the voltage instruction values Vu*, Vv* and Vw* of the above phases and on the battery voltage VB, the PWM generator generates pulse width modulation signals Mu Mv and Mw of the above phases having pulse widths corresponding to the d-axis current instruction value id* and the q-axis current instruction value iq*, and sends them to the drive circuit.

Upon receipt of the pulse width modulation signals Mu, Mv and Mw of the phases, the drive circuit generates six gate signals and sends them to the inverter 40. The inverter 40 includes transistors Tr1 to Tr6 that are not shown, renders the transistors Tr1 to Tr6 conductive only during the period in which the gate signal is on to generate currents Iu, Iv and Iw of the above phases, and feeds the currents Iu, Iv and Iw of the above phases to the stator coils of the drive motor 31.

The torque is thus controlled based on the target torque TM* of the drive motor, whereby the drive motor 31 is driven and the electric car travels. Thus, the feedback control is executed based on the d-axis current instruction value id*, q-axis current instruction value iq* and the estimated d-axis current idp and q-axis current iqp. Therefore, even when the actual sampling periods for the detection currents iu and iv are long, the sampling periods can be substantially shortened. In conducting the feedback control, therefore, the gains Kp and Ki can be increased, enabling the d-axis current id and the q-axis current iq to follow the d-axis current instruction value id* and the q-axis current instruction value iq*, and the transient characteristics can be maintained.

Here, a real current is constituted by the d-axis current id and the q-axis current iq, a current instruction value is constituted by the d-axis current instruction value id* and q-axis current instruction value iq*, and an estimated current is constituted by an estimated d-axis current idp and an estimated q-axis current iqp.

SUMMARY OF THE INVENTION

In estimating the d-axis current idp and the q-axis current iqp in the above conventional electric drive unit, however, the currents Iu, Iv and Iw fed to the stator coils undergo changes, whereby the inductance La of the stator coils changes. As the d-axis and q-axis inductances change, there often occurs an error (hereinafter called "estimated current error") in the estimated d-axis current idp and the q-axis current iqp. In this case, it becomes difficult to bring the d-axis current deviation Δid and the q-axis current deviation Δiq close to zero by relying upon the feedback control, and a steady deviation occurs between the d-axis current id and the q-axis current iq and between the d-axis current instruction value id* and the q-axis current instruction value iq*.

The invention thus provides an electric drive control apparatus that is capable of maintaining transient characteristics even when a current instruction value has sharply changed. The invention also prevents the occurrence of a steady deviation between a real current and a current instruction value even when an estimated current error has occurred by solving the above problems inherent in the conventional electric drive unit. The invention also provides an electric drive control method and a program therefor.

For this purpose, an electric drive control apparatus of the invention comprises an electrically operated machine, a detector for detecting a current supplied to the electrically operated machine, and a controller. The controller estimates a subsequent current based on a detected current, effects proportional operation processing based on an estimated current, effects integration operation processing based on the detected current, generates output signals based on a first value of the proportional operation processing and a second value of the integration operation processing, and generates an electric current to be fed to the electrically operated machine based on the output signals.

In an electric drive control method of the invention, the method comprises the steps of detecting a current supplied to an electrically operated machine, estimating a subsequent current based on a detected current, executing proportional operation processing based on an estimated current, executing integration operation processing based on the detected current, generating an output signal based on a first value of a proportional operation in the proportional operation processing and a second value of an integration operation in the integration operation processing and generating a current to be fed to the electrically operated machine based on the output signal.

In a program for an electric drive control method of the invention, the program comprises a routine for estimating a subsequent current based on a current detected by a current detection unit, a routine for executing a proportional operation processing based on an estimated current, a routine for executing an integration operation processing based on a detected current, a routine for generating an output signal based on a first value of a proportional operation in the proportional operation processing and a second value of an integration operation in the integration operation processing and a routine for generating a current to be fed to the electrically operated machine based on the output signal.

BRIEF DESCRIPTION OF THE DRAWINGS

Various embodiments of the invention will be described with reference to the drawings, wherein.

DETAILED DESCRIPTION OF PREFERRED EMBODIMENTS

An embodiment of the invention will now be described in detail with reference to the drawings. Though the description here deals with an electric car as a vehicle or as an electric vehicle, the invention can be further applied to a hybrid vehicle as an electric vehicle.

Figure 1:
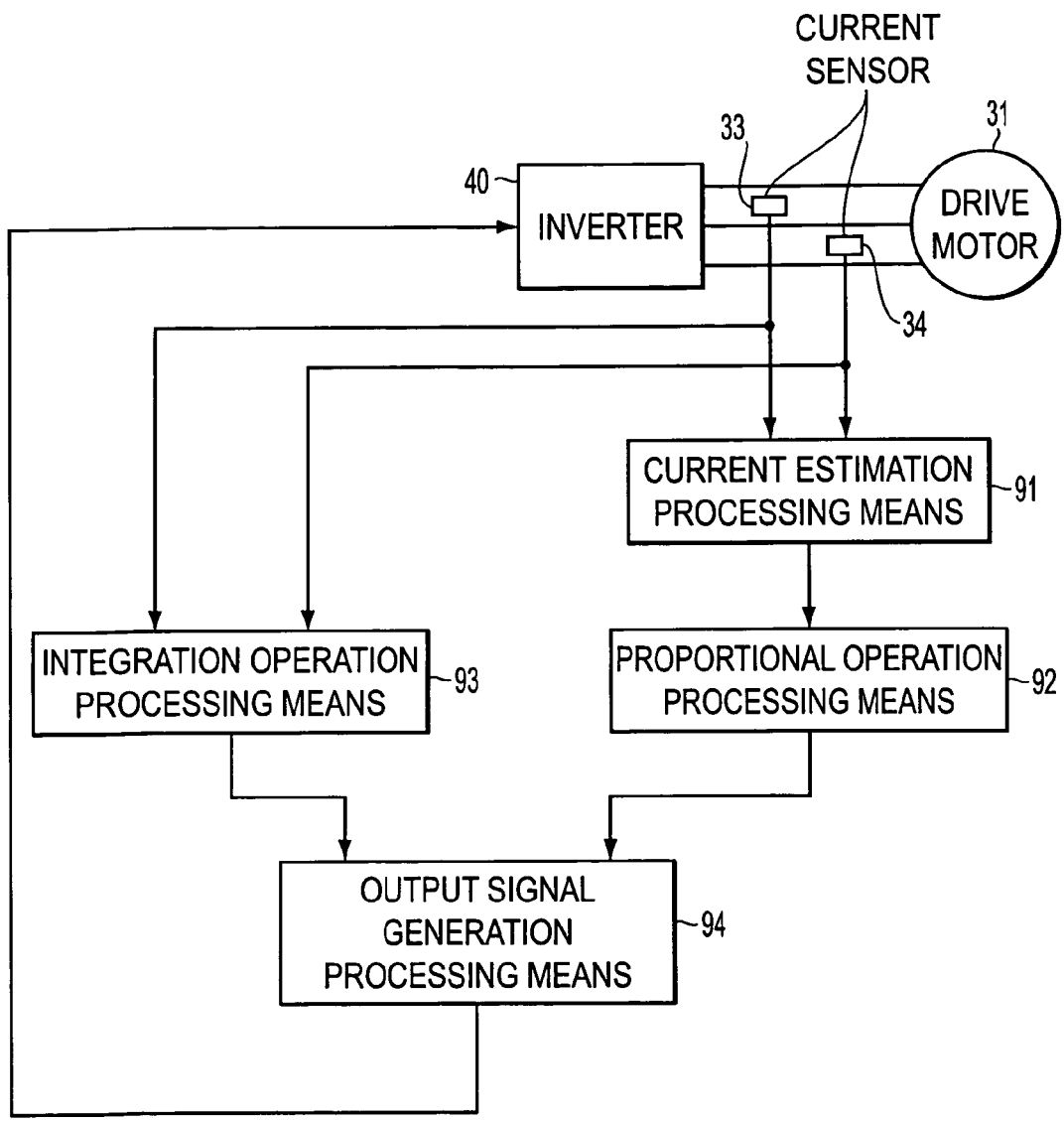
FIG. 1 is a functional block diagram of an electric drive control apparatus according to an embodiment of the invention.
Figure 2:
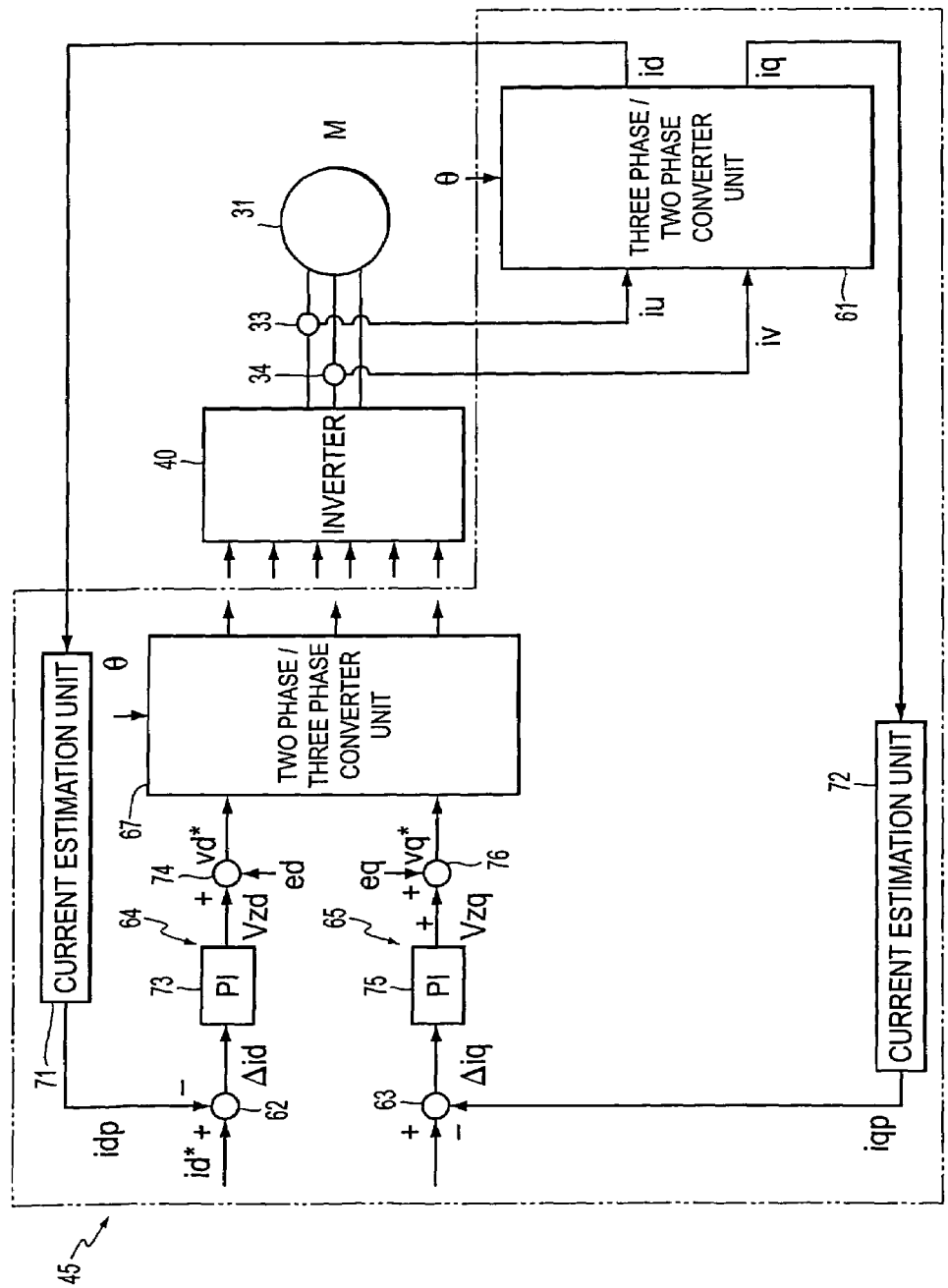
FIG. 2 is a block diagram illustrating major portions in a conventional electric drive unit.

FIG. 1 is a functional block diagram of an electric drive control apparatus according to an embodiment of the invention. In FIG. 1, reference numeral 31 denotes a drive motor as an electrically operated machine, 33 and 34 denote current sensors for detecting currents Iu and Iv fed to the drive motor 31 as current detector units, reference numeral 91 denotes current estimation processing means for estimating a subsequent current based on a detection current, 92 denotes proportional operation processing means for executing a proportional operation processing based on an estimated current, 93 denotes integration operation processing means for executing an integration operation processing based on a detection current, 94 denotes-output signal generation processing means for generating an output signal based on a value of the proportional operation in the proportional operation processing and a value of the integration operation in the integration operation processing, and reference numeral 40 denotes an inverter which is a current generator for generating currents Iu, Iv and Iw fed to the drive motor 31 based on the output signal.

Figure 3:
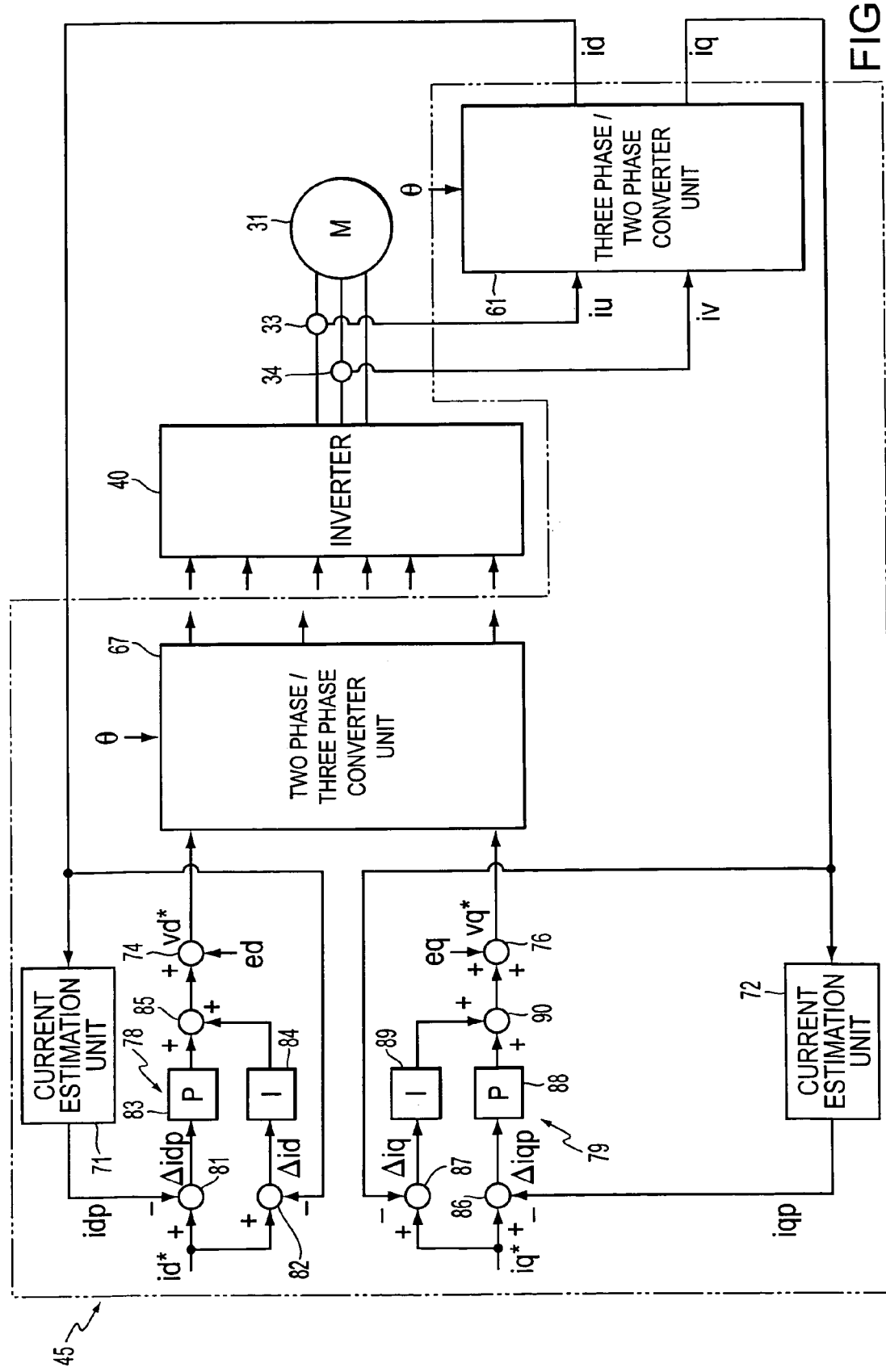
FIG. 3 is a block diagram illustrating major portions in an electric drive unit according to the embodiment of the invention.
Figure 4:
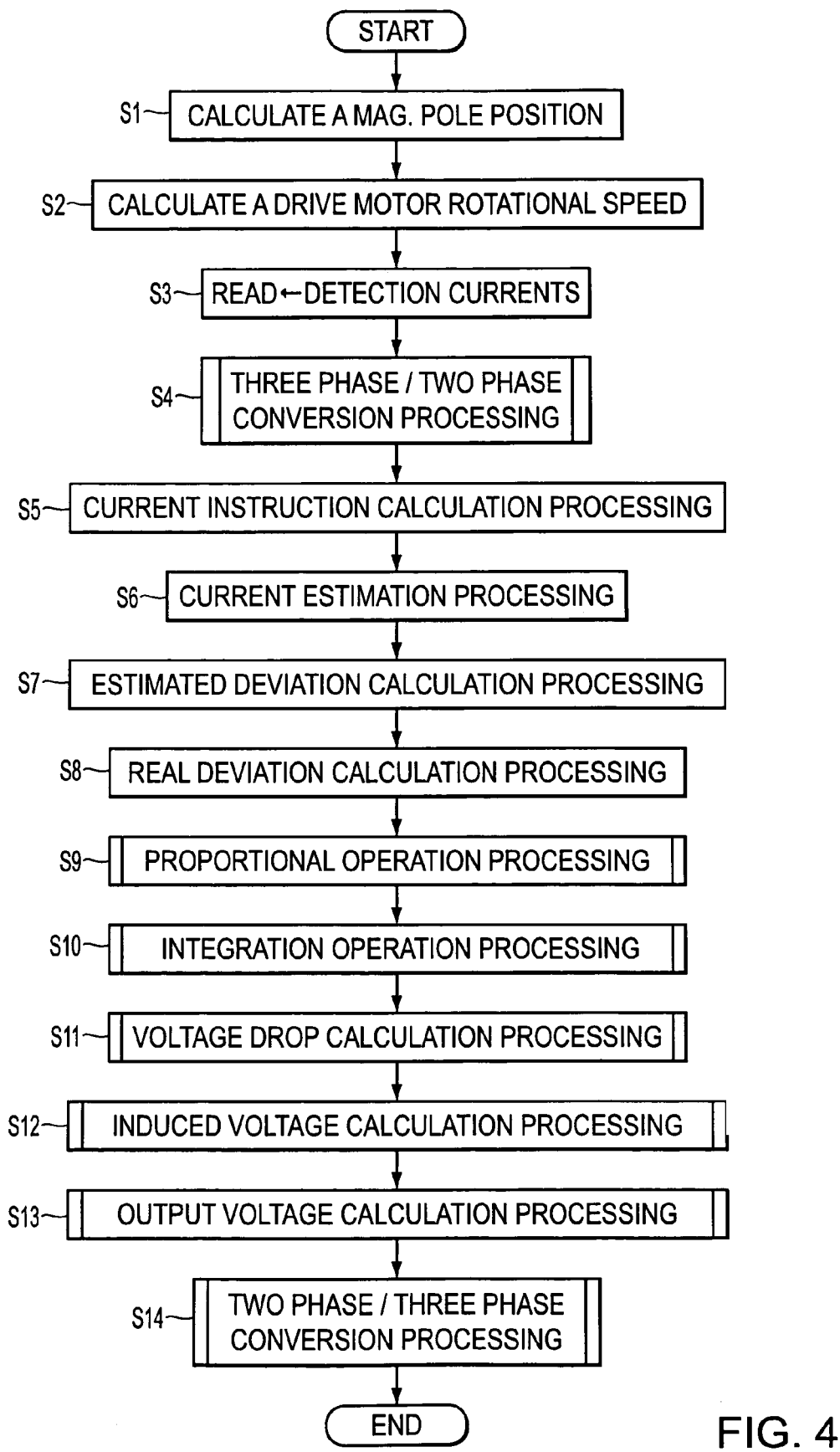
FIG. 4 is a flowchart illustrating the operation of a drive motor control unit according to the embodiment of the invention.

Next, described below is an electric drive unit mounted on the electric car. FIG. 3 is a block diagram illustrating major portions of the electric drive unit according to the embodiment of the invention, and FIG. 4 is a flowchart illustrating the operation of the drive motor control unit according to the embodiment of the invention.

In FIG. 3, reference numeral 31 denotes a drive motor (M) which is an electrically operated machine. The drive motor 31 is mounted on a drive shaft (not shown) of an electric car. In this embodiment, a DC brushless drive motor is used as the drive motor 31. The drive motor 31 includes a rotor (not shown) which freely rotates, and a stator (not shown) arranged on the outer side of the rotor in the radial direction. The rotor includes a rotor core mounted on an output shaft (not shown) coupled to the drive shaft and permanent magnets arranged on a plurality of portions of the rotor core in the circumferential direction, and pairs of magnetic poles are constituted by the S-pole and N-pole of the permanent magnets. The stator includes a stator core forming teeth at a plurality of places in the circumferential direction and protruding inward in the radial direction, and stator coils of U-phase, V-phase and W-phase wound on the teeth. On the output shaft, there is disposed a magnetic pole position sensor (not shown) such as a resolver which is a magnetic pole position detector for detecting a magnetic pole position θ. The magnetic pole position sensor generates a magnetic pole position signal as a sensor output, and sends it to the drive motor control unit 45 which is the electrically operated machine control unit. The electric drive unit is constituted by the drive motor 31, inverter 40 and drive wheels which are not shown.

To run the electric car by driving the drive motor 31, a direct current from a storage battery (not shown) is converted into phase currents, i.e., currents Iu, Iv and Iw of U-phase, V-phase and W-phase through an inverter 40 which is a current generator. The currents Iu, Iv and Iw are fed to the stator coils. For this purpose, the inverter 40 includes transistors Tr1 to Tr6 (not shown) as six switching elements, and generates the currents Iu, Iv and Iw of the phases upon selectively turning the transistors Tr1 to Tr6 on and off. In this embodiment, the inverter 40 is used as a current generating device. Instead of the inverter 40, however, there may be used a power module such as IGBT formed by incorporating 2 to 6 switching elements in a package, or an IPM formed by incorporating a drive circuit or the like circuit in the IGBT.

Here, the stator coils are star-connected. Therefore, if current values of two phases are determined, a current value of the remaining one phase is determined. In order to control the currents Iu, Iv and Iw of the phases, therefore, current sensors 33 and 34 that work as current detector units are arranged on the lead wires of the stator coils of the U-phase and V-phase to detect currents Iu and Iv of the U-phase and V-phase as detection currents iu and iv. The current sensors 33 and 34 send the detection currents iu and iv to the drive motor control unit 45 which, then, calculates a current iw (iw=−iu−iv) based on the detection current iu and iv.

In addition to the CPU (not shown) that works as a computer, the drive motor control unit 45 includes a storage unit (not shown) such as RAM or ROM for recording data and various programs. A map of current instruction values for d-axis and q-axis is set to the ROM.

The ROM stores various programs and data, which, however, may be stored in an external recording medium. In this case, a flash memory is arranged in the drive motor control unit 45, and the programs and data are read out from the external recording medium and are stored in the flash memory. By replacing the external recording medium, therefore, the programs and data can be updated.

Next, described below is the operation of the drive motor control unit 45. First, magnetic pole position calculation means (not shown) in the drive motor control unit 45 executes the magnetic pole position calculation processing, reads a magnetic pole position signal sent from the magnetic pole position sensor, and calculates a magnetic pole position θ based on the magnetic pole position signal. Further, drive motor rotational speed calculation processing means (not shown) in the drive motor control unit 45 executes the drive motor rotational speed calculation processing, and calculates a drive motor rotational speed NM and an angular velocity ω based on the magnetic pole position θ.

Here, the drive motor control unit 45 executes the feedback control based on the vector control operation on a d-q axis model by setting the d-axis in a direction of the pair of magnetic poles of the rotor and setting the q-axis in a direction at right angles with the d-axis.

Therefore, the three phase/two phase converter unit 61 which is a first converter means in the drive motor control unit 45 executes the three phase/two phase conversion processing as a first conversion processing, reads the detection currents iu and iv to calculate the current iw, reads the magnetic pole position θ, and converts the detection currents iu, iv and iw into a d-axis current id and a q-axis current iq. The d-axis current id and the q-axis current iq constitute currents that represent the detection currents iu, iv and iw.

Further, vehicle speed detection means (not shown) in the drive motor control unit 45 executes the vehicle speed detection processing to detect the vehicle speed V corresponding to the drive motor rotational speed NM, and sends the detected vehicle speed V to a vehicle control unit (not shown) that controls the electric car as a whole. Vehicle instruction value generation processing means (not shown) in the vehicle control unit executes the vehicle instruction value generation processing, reads the vehicle speed V and the accelerator opening degree detected by an accelerator opening detector unit (not shown), calculates a required torque TO* for the vehicle based on the vehicle speed V and the accelerator opening degree, generates a target drive motor torque (torque instruction value) TM* representing a target value of the drive motor torque TM that corresponds to the required torque TO* for the vehicle, and sends the torque instruction value TM* to the drive motor control unit 45.

Torque instruction/current instruction converter unit (not shown) which works as current instruction value calculation means in the drive motor control unit 45, executes a current instruction value calculation processing, reads a battery voltage VB detected by a battery voltage detection sensor that is not shown, reads a drive motor rotational speed NM, makes reference to the map of current instruction values, and calculates, as current instruction values, a d-axis current instruction value id* and a q-axis current instruction value iq* corresponding to the target drive motor torque TM*.

Thus, the d-axis current id and the q-axis current iq are calculated as real currents, and the d-axis current instruction value id* and the q-axis current instruction value iq* are calculated as current instruction values representing target values of real current. Then, the feedback control is executed based on the d-axis current id, q-axis current iq, as well as on the d-axis current instruction value id* and q-axis current instruction value iq*.

In this case, when, for example, a driver attempts to quickly start the electric car by depressing the accelerator pedal, the d-axis current instruction value id* and the q-axis current instruction value iq* may often change sharply. When the sampling periods of the detection currents iu and iv are long, however, the drive motor control unit 45 is not allowed to increase the gain in carrying out the feedback control. Therefore, sampling periods can be substantially shortened by estimating a d-axis current idp and a q-axis current iqp after one sampling timing, and executing the proportional integration control based on the estimated d-axis current idp, q-axis current iqp and on the d-axis current instruction value id* and q-axis current instruction value iq*

In estimating the d-axis current id and the q-axis current iq, however, the currents Iu, Iv and Iw fed to the stator coils undergo changes, whereby the inductance La of the stator coils changes. As the inductance Ld on the d-axis and the inductance Lq on the q-axis change, however, there often occur an error in the estimated d-axis current idp and the q-axis current iqp. In this case, it becomes difficult to bring the d-axis current deviation Δid and the q-axis current deviation Δiq close to zero by relying upon the feedback control, and a steady deviation occurs between the d-axis current id and the q-axis current iq and between the d-axis current instruction value id* and the q-axis current instruction value iq*. In this embodiment, therefore, a proportional control is executed based on the estimated d-axis current idp and q-axis current iqp, and an integration control is executed based on real d-axis current id and q-axis current iq.

For this purpose, therefore, the d-axis current id, on one hand, is sent to a current estimating unit 71 which is the current estimation processing means 91 (FIG. 1) in the drive motor control unit 45 to execute a current estimation processing, whereby a d-axis current idp is calculated and estimated after a predetermined number of sampling timings or after one sampling timing in this embodiment. The estimated d-axis current idp is sent as an estimated current to a subtractor 81 which is the estimated deviation calculation processing means in the drive motor control unit 45. The d-axis current id, on the other hand, is sent as a real current to a subractor 82 which is the real deviation calculation processing means in the drive motor control unit 45.

The subtractor 81 executes an estimated deviation calculation processing, calculates a d-axis current deviation Δidp which is an estimated deviation between the d-axis current idp and the d-axis current instruction value id*. The subtractor 82 executes a real deviation calculation processing, calculates a d-axis current deviation Δid which is a real deviation between the d-axis current id and the d-axis current instruction value id*. The d-axis current deviations Δidp and Δid are sent to a voltage instruction value generator unit 78 which is the voltage instruction value generation processing means in the drive motor control unit 45.

The voltage instruction value generator unit 78 includes a proportional operation unit (P) 83 which is the proportional operation processing means 92 in the drive motor control unit 45, an integration operation unit (I) 84 which is the integration operation processing means 93 in the drive motor control unit 45, an adder 85 which is the voltage drop calculation processing means in the drive motor control unit 45, and a subtractor 74 which is the output voltage calculation processing means in the drive motor control unit 45. The proportional operation unit 83 executes the proportional operation processing, whereby a voltage drop Vzdp of the proportional component is calculated as a proportionally operated value, i.e., $$Vzdp = Kp \cdot \Delta idp$$

based on the d-axis current deviation Δidp and a gain Kp for the proportional operation. The integration operation unit 84 executes the integration operation processing, whereby a-voltage drop Vzdi of the integration component is calculated as an integrated operation value, i.e., $$Vzdi = Ki \cdot \Sigma \Delta id$$

based on the d-axis current deviation Δid and a gain Ki for the integration operation. The adder 85 executes the voltage drop calculation processing, whereby the voltage drops Vzdp and Vzdi are added up to calculate a voltage drop Vzd, i.e., $$Vzd = Vzdp + Vzdi$$
$$= Kp \cdot \Delta idp + Ki \cdot \Sigma \Delta id$$

Induced voltage calculation processing means (not shown) in the drive motor control unit 45 executes an induced voltage calculation processing, reads the angular velocity ω and the q-axis current iq, and calculates an induced voltage ed, i.e., $$ed = \omega \cdot Lq \cdot iq$$

induced by the q-axis current iq based on the angular velocity ω, q-axis current iq and inductance Lq on the q-axis.

Then, the subtractor 74 executes the output voltage calculation processing, subtracts the induced voltage ed from the voltage drop Vzd sent from the adder 85, and calculates a d-axis voltage instruction value vd* as a voltage instruction value, i.e., $$vd^* = Vzd - ed$$
$$= Vzd - \omega \cdot Lq \cdot iq$$

Thus, the d-axis voltage instruction value vd* is generated such that the d-axis current deviations Δidp and Δid become zero, and is sent to the two phase/three phase converter unit 67 which is the second conversion processing means in the drive motor control unit 45.

For this purpose, therefore, the q-axis current iq, on one hand, is sent to a current estimating unit 72 which is the current estimation processing means 91 in the drive motor control unit 45 to execute a current estimation processing, whereby a q-axis current iqp is calculated and estimated after a predetermined number of sampling timings or after one sampling timing in this embodiment. The estimated q-axis current iqp is sent as an estimated current to a subtractor 86 which is the estimated deviation calculation processing means in the drive motor control unit 45. The q-axis current iq, on the other hand, is sent as a real current to a subtractor 87 which is the real deviation calculation processing means in the drive motor control unit 45.

The subtractor 86 executes an estimated deviation calculation processing, calculates a q-axis current deviation Δiqp which is an estimated deviation between the q-axis current iqp and the q-axis current instruction value iq*. The subtractor 87 executes a real deviation calculation processing, calculates a q-axis current deviation Δiq which is a real deviation between the q-axis current iq and the q-axis current instruction value iq*. The q-axis current deviations Δiqp and Δiq are sent to a voltage instruction value generator unit 79 which is the voltage instruction value generator processing means in the drive motor control unit 45.

The voltage instruction value generator unit 79 includes a proportional operation unit (P) 88 which is the proportional operation processing means 95 in the drive motor control unit 45, an integration operation unit (I) 89 which is the integration operation processing means 93 in the drive motor control unit 45, an adder 90 which is the voltage drop calculation processing means in the drive motor control unit 45, and an adder 76 which is the output voltage calculation processing means in the drive motor control unit 45. The proportional operation unit 88 executes the proportional operation processing, whereby a voltage drop Vzqp of the proportional component is calculated as a proportionally operated value, i.e., $$Vzqp = Kp \cdot \Sigma \Delta iqp$$

based on the q-axis current deviation Δiqp and a gain Kp for the proportional operation. The integration operation unit 89 executes the integration operation, whereby a voltage drop Vzqi of the integration component is calculated as an integrated operation value, i.e., $$Vzqi = Ki \cdot \Sigma \Delta iq$$

based on the q-axis current deviation Δiq and a gain Ki for the integration operation. The adder 90 executes the voltage drop calculation processing, whereby the voltage drops Vzqp and Vzqi are added up to calculate a voltage drop Vzq, i.e., $$Vzq = Vzqp + Vzqi$$
$$= Kp \cdot \Delta iqp + Ki \cdot \Sigma \Delta iq$$

Induced voltage calculation processing means in the drive motor control unit 45 executes an induced voltage calculation processing, reads the angular velocity ω and the d-axis current id, and calculates an induced voltage eq, i.e., $$eq = \omega(MIf + Ld \cdot id)$$

induced by the d-axis current id based on the angular velocity ω, d-axis current id, constant MIf of counter electromotive force and inductance Ld on the d-axis.

Then, the adder 76 executes the output voltage calculation processing, adds the induced voltage eq to the voltage drop Vzq sent from the adder 90, and calculates a q-axis voltage instruction value vq* as a voltage instruction value, i.e., $$vq^* = Vzq + eq$$
$$= Vzq + \omega(MIf + Ld \cdot id)$$

Thus, the q-axis voltage instruction value vq* is generated such that the q-axis current deviations Δiqp and Δiq will become zero, and is sent to the two phase/three phase converter unit 67.

Then, the two phase/three phase converter unit 67 executes the two phase/three phase conversion which is the second conversion processing, reads the d-axis voltage instruction value vd*, q-axis voltage instruction value vq* and magnetic pole position θ, converts the d-axis voltage instruction value vd* and the q-axis voltage instruction value vq* into voltage instruction values Vu*, Vv* and Vw* of the U-phase, V-phase and W-phase, and sends the voltage instruction values Vu*, Vv* and Vw* to a PWM generator (not shown) which is the output signal generator processing means 94 in the drive motor control unit 45.

The PWM generator executes an output signal generation processing, generates, as output signals, pulse width modulation signals Mu, Mv and Mw having pulse widths corresponding to the d-axis current instruction value id* and the q-axis current instruction value iq* based on the voltage instruction values Vu*, Vv* and Vw* of the above phases and on the battery voltage VB, and sends them to a drive circuit (not shown) provided outside the drive motor control unit 45.

Upon receipt of the pulse width modulation signals Mu, Mv and Mw of the above phases, the drive circuit generates six gate signals and sends them to the inverter 40. Based on the pulse width modulation signals Mu, Mv and Mw, the inverter 40 turns the transistors Tr1 to Tr6 on only when the gate signal is being turned on, whereby currents Iu, Iv and Iw of the phases are generated and are supplied to the stator coils of the drive motor 31. Thus, the torque is controlled based on the target drive motor torque TM*, the drive motor 31 is driven, and the electric car runs.

Next, the flowchart of FIG. 4 will be described. In Step S1, a magnetic pole position θ is calculated, in Step S2, a drive motor rotational speed NM is calculated, in Step S3, detection currents iu, iv are read, in Step S4, a three phase/two phase conversion processing is executed, in Step S5, a current instruction value calculation processing is executed, in Step S6, a current estimation processing is executed, and in Step S7, an estimated deviation calculation processing is executed. Then, in Step S8, a real deviation calculation processing is executed, in Step S9, a proportional operation processing is executed, in Step S10, an integration operation processing is executed, in Step S11, a voltage drop calculation processing is executed, in Step S12, an induced voltage calculation processing is executed, in Step S 13, an output voltage calculation processing is executed, and in Step S14, a two phase/three phase conversion processing to end the processing is executed.

Figure 5:
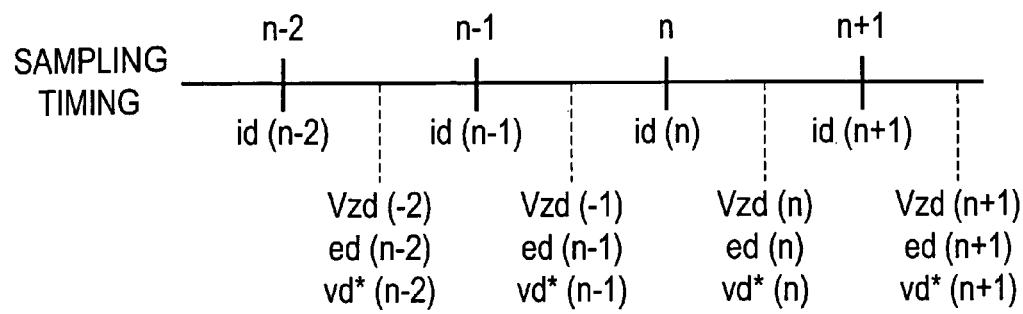
FIG. 5 is a first time chart illustrating the operation of the drive motor control unit according to the embodiment of the invention.

Next, the operation of the drive motor control unit 45 will be described for each of the values of the sampling timings. FIG. 5 is a first time chart illustrating the operation of the drive motor control unit according to the embodiment of the invention, and FIG. 6 is a second time chart illustrating the operation of the drive motor control unit according to the embodiment of the invention.

In this case as shown in FIG. 5, values of d-axis currents id at sampling timings n−2, n−1, n and n+1 are denoted by id(n−2), id(n−1), id(n) and id(n+1), values of voltage drops Vzd are denoted by Vzd(n−2), Vzd(n−1), Vzd(n) and Vzd(n+1), values of induced voltages ed are denoted by ed(n−2), ed(n−1), ed(n) and ed(n+1), and values of d-axis voltage instruction values vd* are denoted by vd*(n−2), vd*(n−1), vd*(n) and vd*(n+1).

Figure 6:
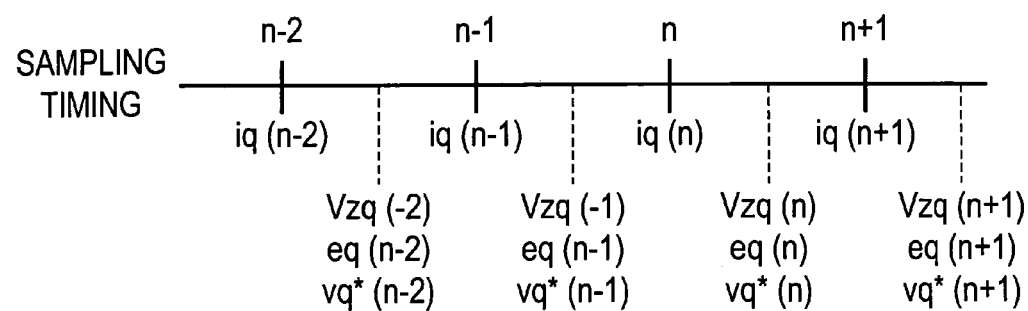
FIG. 6 is a second time chart illustrating the operation of the drive motor control unit according to the embodiment of the invention.

As shown in FIG. 6, further, values of q-axis currents iq at sampling timings n−2, n−1, n and n+1 are denoted by iq(n−2), iq(n−1), iq(n) and iq(n+1), values of voltage drops Vzq are denoted by Vzq(n−2), Vzq(n−1), Vzq(n) and Vzq(n+1), values of induced voltages eq are denoted by eq(n−2), eq(n−1), eq(n) and eq(n+1), and values of q-axis voltage instruction values vq* are denoted by vq*(n−2), vq*(n−1), vq*(n) and vq*(n+1).

At a sampling timing n−1, the three phase/two phase converter unit 61 (FIG. 3) executes a three phase/two phase conversion processing based on the detection currents iu and iv, and generates a value id(n−1) as a d-axis current id and a value iq(n−1) as a q-axis current iq. On the other hand, the torque instruction/current instruction converter unit calculates a value id*(n) as a d-axis current instruction value id* of after one sampling timing n, and calculates a value iq*(n) as a q-axis current instruction value iq* of after one sampling timing n, Then, as described above, the current estimation unit 71 calculates and estimates the d-axis current idp of after one sampling timing n. Here, if the sampling period is denoted by T and the resistance of the stator coil by Ra, then, the current estimation unit 71 calculates a deviation ΔVzf, i.e., $$\Delta Vzf = Vzd - Vfd$$
$$= Vzd - Ra \cdot id$$

between a voltage drop Vzd of the d-axis voltage instruction value vd* calculated based on the d-axis current instruction valud id* and a voltage drop Vfd, i.e., $$Vfd = Ra \cdot id$$

that occurs as the currents Iu, Iv and Iw are fed to the stator coils. The current estimation unit 71 further calculates a change Δid in the current, i.e., $$\Delta id = (T/Ld)(Vzd - Ra \cdot id)$$

based on the deviation ΔVzf, and estimates a d-axis current idp, i.e., $$idp = id + \Delta id$$
$$= id + (T/Ld)(Vzd - Ra \cdot id)$$

based on the change Δid.

Therefore, the current estimation unit 71 reads a d-axis current id(n−1), a voltage drop Vzd(n−1), an induced voltage ed(n−1) and a d-axis voltage instruction value vd*(n−1) at a real sampling timing n−1. Then, a value idp(n) which is a d-axis current idp of after one sampling timing n becomes, $$idp(n) = id(n-1) + (T/Ld)\{vd^*(n-1) - ed(n-1) - Ra \cdot id(n-1)\}$$
$$= id(n-1) + (T/Ld)\{Vzd(n-1) - Ra \cdot id(n-1)\}$$

Thus, when the d-axis current idp of after one sampling timing n is obtained, the subtractor 81 calculates a value Δidp(n), i.e., $$\Delta idp(n) = id^*(n) - id(n)$$

as a d-axis current deviation Δidp between the d-axis current instruction value id* and the d-axis current idp, and the proportional operation unit 83 calculates a value Vzdp(n), $$Vzdp(n) = Kp \cdot \Delta idp(n)$$

as a voltage drop Vzdp of the proportional component. Further, the subtractor 82 calculates a value Δid(n), $$\Delta id(n) = id^*(n) - id(n-1)$$

as a d-axis current deviation Δid between the d-axis current instruction value id* and the present d-axis current id, and the integration operation unit 84 calculates a value Vzdi(n), $$Vzdi(n) = Ki \cdot \Sigma \Delta id(n)$$

as a voltage drop Vzdi of the integration component.

Then, the adder 85 adds up the voltage drops Vzdp and Vzdi together, and calculates a value Vzd(n), $$Vzd(n) = Vzdp(n) + Vzdi(n)$$
$$= Kp \cdot \Delta idp(n) + Ki \cdot \Sigma \Delta id(n)$$

as a voltage drop Vzd.

The induced voltage calculation processing means calculates a value ed(n), i.e., $$ed(n) = \omega \cdot Lq \cdot iq(n)$$

as an induced voltage ed induced by the q-axis current iq. Then, the subtractor 74 calculates a value vd*(n), i.e., $$vd^*(n) = Vzd(n) - ed(n)$$
$$= Vzd(n) - \omega \cdot Lq \cdot iq(n)$$

as a d-axis voltage instruction value vd*.

Similarly, the current estimation unit 72 calculates and estimates a q-axis current iqp of after one sampling timing n. In this case, the current estimation unit 72 calculates a deviation $\Delta Vzf$, i.e., $$\Delta Vzf = Vzq - Vfq$$
$$= Vzq - Ra \cdot iq$$

between a voltage drop Vzq of the q-axis voltage instruction value vq* calculated based on the q-axis current instruction value iq* and the voltage drop Vfq, $$Vfq = Ra \cdot iq$$

that generates as the currents Iu, Iv and Iw are fed to the stator coils. The current estimation unit 72 further calculates a change $\Delta iq$ in the current, $$\Delta iq = (T/Lq)(Vzq - Ra \cdot iq)$$

based on the deviation $\Delta Vzf$, and estimates a q-axis current iqp, $$iqp = iq + \Delta iq$$
$$= iq + (T/Lq)(Vzq - Ra \cdot iq)$$

based on the change $\Delta iq$.

For this purpose, the current estimation unit 72 reads a q-axis current iq(n−1), a voltage drop Vzq(n−1), an induced voltage eq(n−1) and a q-axis voltage instruction value vq*(n−1) at a real sampling timing n−1. Then, a value iqp(n) which is a q-axis current iqp of after one sampling timing n becomes, $$iq(n) = iq(n-1) + (T/Lq)\{vq*(n-1) - eq(n-1) - Ra \cdot iq(n-1)\}$$
$$= iq(n-1) + (T/Lq)\{Vzq(n-1) - Ra \cdot iq(n-1)\}$$

Thus, when a q-axis current iqp of after one sampling timing n is obtained, the subtractor 86 calculates a value $\Delta iqp(n)$, i.e., $$\Delta iqp(n) = iq^*(n) - iq(n)$$

as a q-axis current deviation $\Delta iqp$ between the q-axis current instruction value iq* and the q-axis current iqp, and the proportional operation unit 88 calculates a value Vzqp(n), $$Vzqp(n) = Kp \cdot \Delta iqp(n)$$

as a voltage drop Vzqp of the proportional component. Further, the subtractor 87 calculates a value $\Delta iq(n)$, i.e., $$\Delta iq(n) = iq^*(n) - iq(n-1)$$

as a q-axis current deviation $\Delta iq$ between the q-axis current instruction value iq* and the present q-axis current iq, and the integration operation unit 89 calculates a value Vzqi(n), $$Vzqi(n) = Ki \cdot \Sigma \Delta iq(n)$$

as a voltage drop Vzqi of the integration component.

Then, the adder 90 adds up the voltage drops Vzqp and Vzqi together, and calculates a value Vzq(n), $$Vzq(n) = Vzqp(n) + Vzqi(n)$$
$$= Kp \cdot \Delta iqp(n) + Ki \cdot \Sigma \Delta iq(n)$$

as a voltage drop Vzq.

Further, the induced voltage calculation processing means calculates a value eq(n), $$eq(n) = \omega\{MIf + Ld \cdot id(n)\}$$

as an induced voltage eq induced by the d-axis current id, and the adder 76 calculates a value vq*(n), $$vq^*(n) = Vzq(n) + eq(n)$$
$$= Vzq(n) + \omega\{MIf + Ld \cdot id(n)\}$$

as a q-axis voltage instruction value vq*.

In this embodiment, for example, when a driver attempts to quickly start the electric car by depressing the accelerator pedal, the d-axis current instruction value iq* and the q-axis current instruction value iq* may often change sharply. In the proportional control operation, therefore, the d-axis current instruction value id* and the q-axis current instruction value iq* vary in proportion to the magnitude of change. Here, however, the proportional control operation is executed based upon the d-axis current idp and the q-axis current iqp that are estimated. Therefore, even a long sampling period T of the detected currents iu and iv can be substantially shortened. As a result, the gain Kp can be increased in the proportional control operation, and the d-axis current id and the q-axis current iq vary following the d-axis current instruction value id* and the q-axis current instruction value iq*, and transient characteristics are maintained.

Further, even if error occurs in the estimated d-axis current idp and the q-axis current iqp, the integration control operation is executed based on the real d-axis current id and the q-axis current iq, and is not affected by an error in the estimated currents. It is therefore possible to bring the d-axis current deviation $\Delta id$ and the q-axis current deviation $\Delta iq$ close to zero and to prevent the occurrence of a steady deviation between the d-axis current id and the q-axis current iq and between the d-axis current instruction value id* and the q-axis current instruction value iq*.

In this embodiment, the current estimation units 71 and 72 estimate the d-axis current id and the q-axis current iq after one sampling timing. However, the d-axis current id and the q-axis current iq after a predetermined number of sampling timings may be estimated.

The invention is in no way limited to the above embodiment only but can be modified in a variety of ways relying upon the gist of the invention without departing from the scope of the invention. According to this invention as described above in detail, an electric drive control apparatus includes an electrically operated machine, a detector for detecting a current supplied to the electrically operated machine, and a controller that estimates a subsequent current based on a detected current, effects proportional operation processing based on an estimated current, effects integration operation processing based on the detected current, generates output signals based on a first value of the proportional operation processing and a second value of the integration operation processing, and generates an electric current to be fed to the electrically operated machine based on the output signals.

In this case, the proportional control is executed based on the estimated currents, and the sampling period of the detection currents can be substantially shortened. As a result, an increased gain is obtained in the proportional control, the real currents follow the current instruction values, and transient characteristics are maintained.

Besides, even if an error occurs on the estimated currents, the integration control is executed based on the real currents without being affected by the error in the estimated currents. It is therefore made possible to prevent the occurrence of a steady deviation between the real currents and the current instruction values.

What is claimed is:

1. An electric drive control apparatus, comprising:
   an electrically operated machine;
   a detector for detecting a current supplied to the electrically operated machine; and
   a controller that:
     estimates a subsequent current based on a detected current;
     effects proportional operation processing based on an estimated current;
     effects integration operation processing based on the detected current;
     generates output signals based on a first value of the proportional operation processing and a second value of the integration operation processing; and
     generates an electric current to be fed to the electrically operated machine based on the output signals.

2. The electric drive control apparatus according to claim 1, wherein the controller estimates the subsequent current based on the detected current after a predetermined number of sampling timings.

3. The electric drive control apparatus according to claim 2, wherein the controller calculates a change in the estimated current based on a deviation between a first voltage drop of a voltage instruction value calculated based on a current instruction value and a second voltage drop that occurs as currents are supplied to stator coils, and estimates a current based on the change in the current.

4. The electric drive control apparatus according to claim 1, wherein the controller executes the proportional operation processing based on a current instruction value and the estimated current.

5. The electric drive control apparatus according to claim 1, wherein the controller executes the integration operation processing based on a current instruction value and the detected current.

6. The electric drive control apparatus according to claim 1, wherein the controller:
   calculates a voltage drop by adding a value of a proportional operation in the proportional operation processing and a value of an integration operation in the integration operation processing; and
   generates an output signal based on the voltage drop and an induced voltage.

7. The electric drive control apparatus according to claim 1, wherein the controller estimates the subsequent current based on the detected current after one sampling timing.

8. An electric drive control method, comprising:
   detecting a current supplied to an electrically operated machine;
   estimating a subsequent current based on a detected current;
   executing proportional operation processing based on an estimated current;
   executing integration operation processing based on the detected current;
   generating an output signal based on a first value of a proportional operation in the proportional operation processing and a second value of an integration operation in the integration operation processing; and
   generating a current to be fed to the electrically operated machine based on the output signal.

9. The method of claim 8, wherein the subsequent current is estimated based on the detected current after a predetermined number of sampling timings.

10. The method of claim 9, wherein a change in the estimated current is calculated based on a deviation between a first voltage drop of a voltage instruction value calculated based on a current instruction value and a second voltage drop that occurs as currents are supplied to stator coils, and a current is estimated based on the change in the current.

11. The method of claim 8, wherein the proportional operation processing is executed based on a current instruction value and the estimated current.

12. The method of claim 8, wherein the integration operation processing is executed based on a current instruction value and the detected current.

13. The method of claim 8, further comprising:
   calculating a voltage drop by adding a value of a proportional operation in the proportional operation processing and a value of an integration operation in the integration operation processing; and
   generating an output signal based on the voltage drop and an induced voltage.

14. The method of claim 8, wherein the subsequent current is estimated based on the detected current after one sampling timing.

* * * * *